United States Patent
Dudley et al.

(10) Patent No.: US 10,635,792 B2
(45) Date of Patent: Apr. 28, 2020

(54) MULTI-FACTOR AUTHENTICATION WITH URL VALIDATION

(71) Applicant: Sybase 365, Inc., Dublin, CA (US)

(72) Inventors: William Dudley, Lovettsville, VA (US); Steven Garcia, South Riding, VA (US); Khalid Abdullah, Ashburn, VA (US); Fernando Nakano, Reston, VA (US)

(73) Assignee: Sybase 365, Inc., Dublin, CA (US)

( * ) Notice: Subject to any disclaimer, the term of this patent is extended or adjusted under 35 U.S.C. 154(b) by 212 days.

(21) Appl. No.: 15/692,754

(22) Filed: Aug. 31, 2017

(65) Prior Publication Data

US 2019/0065724 A1 Feb. 28, 2019

(51) Int. Cl.
| | |
|---|---|
| *G06F 21/31* | (2013.01) |
| *G06F 21/35* | (2013.01) |
| *H04L 9/32* | (2006.01) |
| *H04L 29/06* | (2006.01) |
| *H04W 12/06* | (2009.01) |
| *H04L 29/08* | (2006.01) |

(52) U.S. Cl.
CPC .............. *G06F 21/31* (2013.01); *G06F 21/35* (2013.01); *H04L 9/3215* (2013.01); *H04L 9/3271* (2013.01); *H04L 63/08* (2013.01); *H04L 63/18* (2013.01); *H04L 67/02* (2013.01); *H04W 12/06* (2013.01); *G06F 2221/2111* (2013.01); *G06F 2221/2137* (2013.01); *H04L 2463/082* (2013.01)

(58) Field of Classification Search
CPC .......... G06F 21/33; G06F 21/44; G06F 21/31; G06F 21/35; G06F 2221/2137; G06F 2221/2111; H04L 63/0815; H04L 2463/082; H04L 9/3247; H04L 67/02; H04L 63/08; H04L 9/3215; H04L 63/18; H04L 9/3271
See application file for complete search history.

(56) References Cited

U.S. PATENT DOCUMENTS

| | | | |
|---|---|---|---|
| 6,697,806 B1 * | 2/2004 | Cook ................... | G06F 21/31 |
| 7,363,361 B2 * | 4/2008 | Tewari ................. | H04L 12/14 |
| | | | 709/223 |
| 2003/0152904 A1 * | 8/2003 | Doty, Jr. ............... | G09B 7/00 |
| | | | 434/350 |
| 2004/0181490 A1 * | 9/2004 | Gordon ................ | G06F 21/10 |
| | | | 705/59 |
| 2007/0030824 A1 * | 2/2007 | Ribaudo .............. | G01S 5/0018 |
| | | | 370/328 |

(Continued)

OTHER PUBLICATIONS

RFC 6238: IETF, May 2011, M'Raihi et al. TOTP: Time-Based One-Time Password Algorithm, pp. 1-16.*

(Continued)

*Primary Examiner* — Theodore C Parsons
*Assistant Examiner* — Thomas Ho
(74) *Attorney, Agent, or Firm* — Fish & Richardson P.C.

(57) ABSTRACT

Techniques are provided for providing multi-factor authentication with Uniform Resource Locator (URL) validation (MFAUV). One of the multiple authentication factors used may include a unique, user-specific URL that is sent to the user within a message. In this way, the user may simply click on, or otherwise execute or select, the provided URL, directly from within the message in which the URL is provided.

19 Claims, 6 Drawing Sheets

(56) References Cited

U.S. PATENT DOCUMENTS

| | | | | |
|---|---|---|---|---|
| 2008/0067240 A1* | 3/2008 | Nakano | ............... | G06Q 20/06 235/380 |
| 2009/0106561 A1* | 4/2009 | Ejiri | ............... | G06F 21/62 713/193 |
| 2013/0043302 A1* | 2/2013 | Powlen | ............... | G06F 16/381 235/375 |
| 2013/0125226 A1* | 5/2013 | Shah | ............... | H04L 63/0815 726/7 |
| 2014/0082715 A1* | 3/2014 | Grajek | ............... | H04L 63/083 726/8 |
| 2014/0095871 A1* | 4/2014 | Hoard | ............... | H04L 63/0428 713/168 |
| 2015/0154813 A1* | 6/2015 | Rakow | ............... | G07B 17/00435 705/60 |
| 2015/0310438 A1* | 10/2015 | Kassemi | ............... | G06Q 20/405 705/44 |
| 2016/0028538 A1* | 1/2016 | Yoon | ............... | H04L 9/0631 380/44 |
| 2017/0161486 A1* | 6/2017 | Jeon | ............... | G06F 21/44 |
| 2017/0257363 A1* | 9/2017 | Franke | ............... | H04L 63/0853 |

OTHER PUBLICATIONS

Marci Carpenter, Aug. 11, 2016, "Webex Outlook Frequently Asked Questions", pp. 1-77.*

* cited by examiner

MULTI-FACTOR AUTHENTICATION WITH URL VALIDATION

TECHNICAL FIELD

This description relates to network authentication.

BACKGROUND

Authentication of users to avoid illicit access to network resources by unauthorized users is of paramount importance in providing and maintaining ecommerce and other network services. For example, network users must be able to trust that network providers can maintain confidential data securely, and network providers must be able to trust that unauthorized network users are not seeking to exploit provided resources.

Unfortunately, authentication techniques are often difficult, expensive, or otherwise problematic for both users and providers. For example, providers typically wish to minimize the liability and expense of maintaining and using authentication data for large numbers of users. Meanwhile, users typically wish to avoid the inconvenience and difficulty of remembering and using the various types of passwords, question/answer pairs, PINs, and other authentication techniques that are commonly used. Moreover, such authentication techniques are often subject to breaches, such as when an illicit user obtains a user's password.

One technique for providing authentication is known as multi-factor authentication, or MFA. Generally speaking, MFA uses two or more of something that the user knows (e.g., username/password), something the user possesses (e.g., a mobile device), and a characteristic of the user (e.g., biometrics, such as fingerprints). By authenticating using multiple ones of these factors, MFA helps to ensure a security and reliability of authentication processes.

In one example of MFA, a first authentication technique (such as a username/password combination) is used as a first authentication factor for network access, and then a PIN is separately provided to the user, often as a text message to the user's mobile device, as a second authentication factor. By entering the PIN separately upon receipt, the user obtains the desired network access. In these techniques, the odds of secure authentication being successful are increased by the additional use of an out-of-band or secondary communications channel (e.g., the text message) to the user's mobile device, which may be presumed to be in the unique possession of the user. However, users often find the requirements of obtaining and separately entering the PIN to be inconvenient, and subject to potential user error in quickly and correctly entering the provided PIN.

SUMMARY

Techniques are provided for providing multi-factor authentication with Uniform Resource Locator (URL) validation (MFAUV). In the described MFA techniques, one of the multiple authentication factors used includes a unique, user-specific URL that is sent to the user within a message and via a secondary communications channel. In this way, the user may simply click on, tap, or otherwise execute or select, the provided URL, directly from within the message in which the URL is provided.

Accordingly, the user is provided with a streamlined process, which does not require separate entry of a PIN or other access code. Moreover, the use of the described URL enables easy use of additional authentication techniques, such as location-based authentication, or the providing of coupons or other user-specific services. Further, a provider of a network resource may utilize the advantages as MFAUV as a service, without having to assume full responsibility and expense for maintaining confidential user data, or implementing the described MFA techniques.

The details of one or more implementations are set forth in the accompanying drawings and the description below. Other features will be apparent from the description and drawings, and from the claims.

DETAILED DESCRIPTION

Figure 1:
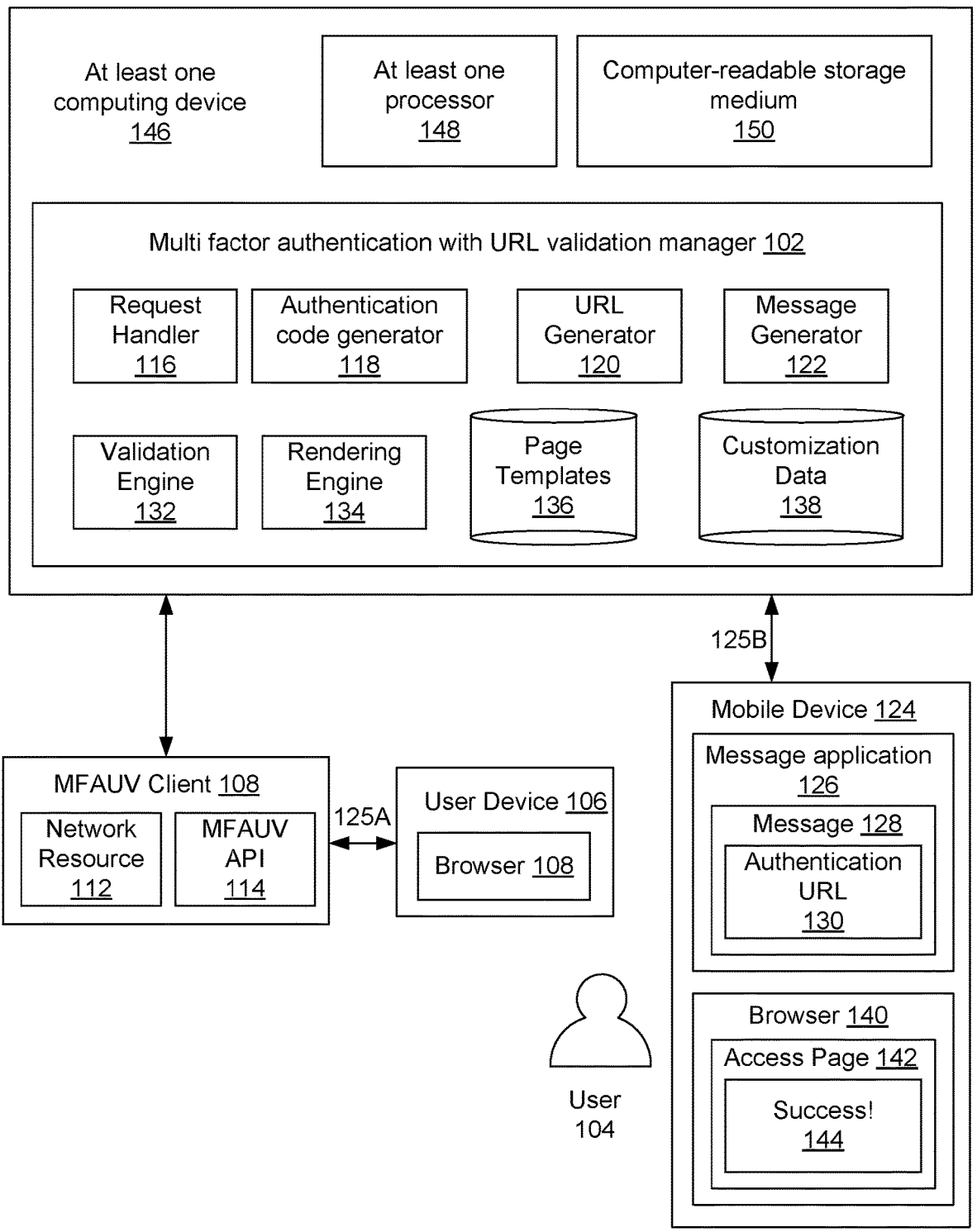
FIG. 1 is a block diagram of a system for multifactor authentication with URL validation.

FIG. 1 is a block diagram of a system for multifactor authentication with URL validation. In the example of FIG. 1, a multifactor authentication with URL validation (MFAUV) manager 102 is configured to manage authentication of a user 104 utilizing a user device 106. More specifically, as shown, the user device 106 provides a browser application 108 that is utilized by the user 104 to execute a network interaction with a MFAUV client 110 providing a network resource 112.

In the example of FIG. 1, the user 104 wishes to access and utilize the network resource 112 provided by the MFAUV client 110, and the MFAUV client 110 requires authentication of the user 104 before providing the desired network access to the network resource 112. The MFAUV client 110, however, is not configured in the example of FIG. 1 to execute all necessary authentication processes directly, and instead utilizes a MFAUV application program interface (API) 114 to interface with, and leverage functionalities of, the MFAUV manager 102.

In practice, the user 104 may represent virtually any individual or entity that may benefit from, or utilize, the authentication processes of the MFAUV manager 102, such as a customer, employee, employer, vendor, or any other individual. Accordingly, the user device 106 should be understood to represent any suitable device that may be utilized by the user 104 to execute any appropriate type of network-based communication. For example, the user device 106 may represent a desktop computer, a laptop computer, a tablet, or a mobile device, such as a Smartphone. In the example of FIG. 1, the user device 106 is illustrated as executing the browser 108, which may represent any commercially available or otherwise suitable browser application. Further, in additional or alternative implementations, such as those described below with respect to FIG. 5, it is not necessary for the user device 106 to utilize the browser 108, as the user device 106 may be utilized in the context of the system 100 while using any suitable or available network-based communication and associated applications (such as when communicating through the use of simple message system (SMS) messages).

Meanwhile, the MFAUV client 110 should be understood to represent virtually any entity that wishes to provide a network-based resource, represented by the network resource 112, and that desires or requires authentication of the user 104 prior to the providing of such network resources. For example, the MFAUV client 110 may represent a business, an individual, a nonprofit organization, a governmental entity, and any associated technical systems that may be utilized by these or other suitable entities to provide the network resource 112 and the MFAUV API 114.

To provide just a few non-limiting examples for the sake of illustration, the MFAUV client 110 may represent an ecommerce company seeking to sell or otherwise provide goods or services to the user 104. In such cases, the network resource 112 may represent the goods or services being sold or provided, including (the ability to order) physical goods that may be shipped to the user 104, as well as software that may be downloaded by the user 104 over a network connection with the MFAUV client 110. The network resource 112 also may refer to a confidential, secure user account of the user 104 that has been established at the MFAUV client 110.

In other examples, the MFAUV client 110 may represent an employer of the user 104, and the network resource 112 may represent functionalities provided to the user 104 so that the user 104 may provide duties or responsibilities of the user 104 in his or her capacity as an employee. For example, the MFAUV client 110 may represent a shipping company, and the network resource 112 may represent an application that may be utilized by the user 104 to control shipping resources and schedules.

As may be observed from these and similar examples, it is typically imperative for the user 104 to be authenticated correctly, in order to avoid misuse of, or other illicit access, to the network resource 112. At the same time, it will be appreciated that the MFAUV client 110 may interact with a very large number of users represented by the user 104, particularly when the user 104 represents virtually any member of the general public.

As described above, consequently, it may be extremely difficult, expensive, or otherwise problematic for the MFAUV client 110 to maintain responsibility for authenticating the user 104. Therefore, in the example of FIG. 1, the MFAUV client 110 is illustrated as leveraging and utilizing the MFAUV manager 102 to provide at least a portion of authentication processes for authenticating the user 104.

In this regard, it will be appreciated that the MFAUV client 110 represents a potentially large number of MFAUV clients that may interact with, and utilize, the MFAUV manager 102. At the same time, it will be appreciated that the system 100 of FIG. 1 is merely representative of various example implementations, and, in other implementations, an entity represented by the MFAUV client 110 may directly provide some or all of the functionalities of the MFAUV manager 102 to the user 104.

In the example of FIG. 1, however, as already referenced, the MFAUV client 110 utilizes the MFAUV API 114 to interact with the MFAUV manager 102. In practice, the MFAUV API 114 may be obtained from a provider of the MFAUV manager 102 by the MFAUV client 110, such as when the MFAUV client 110 downloads associated software, and otherwise registers as a client of the MFAUV manager 102.

As described in detail below, the MFAUV API 114 allows the MFAUV client 110 to interact with the user device 106 (e.g., with the browser 108), to thereby receive one or more authentication requests from the user 104. The MFAUV API 114 may be further configured to relay such authentication requests to the MFAUV manager 102, so that subsequent authentication procedures may proceed. The MFAUV API 114 may also receive return messages from the MFAUV manager 102, indicating that authentication has been successfully completed, so that the MFAUV client 110 may thus proceed with providing the requested access to, or use of, the network resource 112.

In the example of FIG. 1, as referenced above, the MFAUV manager 102 is illustrated and described as being used in conjunction with at least two authentication factors. In this regard, it will be appreciated that one or more of the at least two authentication factors may be implemented using any known, conventional, or future authentication factor that may be desired by, and available to, the MFAUV client 110, via the MFAUV manager 102 or other suitable provider. For example, such authentication factors may include standard username/password combinations, biometric authentication factors (such as iris scans or fingerprint scans), secret answer or challenge questions, or other suitable techniques. In this regard, it will be appreciated that such techniques may be provided by one or both of the MFAUV manager 102 and/or the MFAUV client 110, or by another authentication provider (not illustrated in FIG. 1). As such techniques are presumed for the sake of this description to be standard, conventional, or otherwise known or available, the variations or such details of such techniques are not provided or illustrated herein, except as may be necessary or helpful in understanding operations of the system 100.

Thus, in example implementations of the system 100 of FIG. 1, the MFAUV client 110 may initially receive an authentication request from the user 104, via the user device 106, and may relay the authentication request to a request handler 116 of the MFAUV manager 102. In conjunction with the received authentication request, as just referenced, one or more initial authentication procedures may be implemented, using an associated one or more authentication factors.

For example, a username and password of the user 104 may be required. In these and similar examples, as also just referenced, the username/password combination may be validated at or by the MFAUV client 110, or may be relayed to the request handler 116 for validation at the MFAUV manager 102.

Then, in conjunction with (e.g., based upon a successful completion of) such authentication processes, an authentication code generator 118 may receive the authentication request from the request handler 116, and proceed to generate a unique authentication code associated with the authentication request, and thereby with the user 104. For example, as described in detail below, the authentication code generator 118 may receive various authentication parameters associated with the authentication request that may be associated with, specific to, or unique to, the user device 106 and/or the user 104, or the authentication request itself.

For example, the authentication code generator 118 may utilize a time (e.g., using a timestamp) at which the authentication request was received, an identity of the MFAUV client 110, a general or specific location of the user 104, a username/password or other authentication factor of the user 104, or information uniquely associated with the user device 106 (such as a phone number, in examples in which the user device 106 represents a Smartphone or other mobile device).

The authentication code generator 118 may then utilize various combinations of these authentication parameters in conjunction with a suitable algorithm to generate a unique authentication code associated with the unique authentication request. Examples of such algorithms that may be utilized by the authentication code generator 118 are provided below in conjunction with FIG. 6, for the sake of illustration and example. However, it will be appreciated that these are merely intended as non-limiting examples, and other current or future algorithms and associated techniques may be utilized to generate the unique authentication code.

In general, for the sake of conceptually understanding example operations of the authentication code generator 118, it is assumed that the authentication code generator 118 utilizes a hashing algorithm that receives the one or more authentication parameters of the received authentication request, and combines and hashes these values to generate a unique or practically unique value for that particular user. For example, the authentication code generator 118 may receive a phone number of the user device, an identifier of the MFAUV client 110, and a timestamp or time window associated with the authentication request. The authentication code generator 118 may then pass these three values through a suitable hashing algorithm, to thereby obtain a resulting hashed value.

Using this hashed value, or an abbreviated value uniquely derived therefrom, a uniform resource locator (URL) generator 120 may be configured to generate a unique URL. That is, the resulting, unique URL may be understood to represent, for example, a standard or pre-prepared URL that is uniquely parameterized using the hashed value, or derivation thereof. Accordingly, the resulting, parameterized URL represents a URL that is unique to the user 104, and to the associated authentication request.

In the example of FIG. 1, a message generator 122 may then proceed to generate and send a message to a mobile device 124 of the user 104. In this regard, in the example of FIG. 1, it will be appreciated from the illustration that the mobile device 124 is depicted as a separate device from the user device 106, from which the original authentication request originated. Such example implementations clearly demonstrate that the original authentication request, and any associated, original authentication factor (such as a username/password combination) may be communicated and executed via a first communications channel 125A.

Meanwhile, the MFAUV manager 102, including the message generator 122, may communicate with the mobile device 124 via a second or secondary communications channel 125B. In this way, as referenced above and described in detail below, a success and security of the authentication request and associated authentication may be enhanced and improved, since it is unlikely that an unauthorized user of the network resource 112 will be able to illicitly and successfully access both of the separate communications channels 125A, 125B. Nonetheless, it will be appreciated that, in various implementations (such as those illustrated below with respect to FIGS. 3-5), the mobile device 124 may embody both the user device 106 and the mobile device 124 illustrated separately in FIG. 1, including communicating via both of the communications channels 125A, 125B, as described herein.

In the example of FIG. 1, the type of out-of-band or secondary communications channel 125B just referenced is primarily illustrated and described as a messaging network, such as the SMS messaging network. The secondary communications channel 125B also may include Rich Communications Services/Suite (RCS) (perhaps using Session Initiation Protocol (SIP) and associated Uniform Resource Indicator (URI)). The secondary communications channel 125B also may include an email (email address), or other appropriate addressing mechanism.

For the example of the SMS messaging network, FIG. 1 illustrates that the message generator 122 interacts with a message application 126 to send a message 128 that includes an authentication URL 130 representing the uniquely parameterized URL provided by the URL generator 120, using the authentication code of the authentication code generator 118.

In this way, the user 104 may quickly and easily select (e.g., click on or otherwise execute) the link associated with the authentication URL 130. In so doing, the selection of the authentication URL 130 and at least one associated access parameter may be passed as an access request to the MFAUV manager 102.

For example, a validation engine 132 may be configured to receive the selection of the authentication URL 130 and associated access parameters. As described in detail below, at least one of the access parameters received in conjunction with the selection of the authentication URL 130 may match or correspond to the one or more authentication parameters originally received in conjunction with the authentication request, and used by the authentication code generator 118 to generate the authentication code.

Accordingly, the validation engine 132 may proceed to validate or otherwise match the received access parameters with the originally-received authentication parameters. For example, the validation engine 132 may match a time or time window of the receipt of the access parameter with the corresponding time or time window of the authentication parameter. Similarly, the validation engine 132 may validate or otherwise match the user's phone number or location, or the identifier of the MFAUV client 110, to thereby correspond the selection of the authentication URL with the authentication code provided by the authentication code generator 118.

In examples in which the authentication code generator 118 utilizes a suitable hashing algorithm as described above, the validation engine 132 may execute validation by performing the same or similar hashing algorithm with the received access parameters, as was originally performed with respect to the received authentication parameters. Then, by matching the resulting hashed values, validation may be completed. Of course, other suitable validation or matching techniques may be utilized.

Once validation is completed, a rendering engine 134 may access and utilize one or more page templates 136 and associated customization data 138 to render, using a browser 140 of the mobile device 124, an access page 142 that includes an authentication success message 144. For example, the page templates 136 may represent one or more page templates of static content that is designed to indicate authentication success. Since the MFAUV client 110 represents one of a potentially large number of MFAUV clients, as referenced above, it may be desirable to render the access page 142 in a manner that is customized for each individual MFAUV client.

Accordingly, in operation, the rendering engine 134 may identify the MFAUV client 110 associated with the current authentication request, and may access a corresponding page template of the page templates 136, as well as corresponding customization data from the customization data 138, to thereby generate the access page 142. For example, the rendering engine 134 may render the access page 142 as including a logo or other identifier of the MFAUV client 110. Further, as described with respect to the example of FIG. 4, other aspects or functionality, including dynamic interactions with the user 104, may be provided to the user 104 in conjunction with the access page 142.

In the example of FIG. 1, the MFAUV manager 102 is illustrated as being executed using at least one computing device 146, which itself includes at least one processor 148 and a non-transitory computer readable storage medium 150. Accordingly, it will be appreciated that the MFAUV manager 102, although illustrated as a single module in the example of FIG. 1, may be implemented using two or more computing devices in communications with one another.

That is, for example, the various sub-modules of the MFAUV manager 102 may be implemented on two or more computing devices. For example, the rendering engine 134, page templates 136, and customization data 138 may be implemented using a web server that is separate from an application server used to implement one or more of the remaining sub-modules of the MFAUV manager 102 illustrated in FIG. 1. Somewhat similarly, the message generator 122 may be implemented separately, as part of an SMS messaging network or other suitable network utilized to implement and leverage the secondary communications channel 125B.

Further, it will be appreciated that any single sub-module of the MFAUV manager 102 may be implemented as two or more sub-modules, or, conversely, any two or more illustrated sub-modules may be executed as a single module. For example, it may occur that the authentication code generator 118 and the validation engine 132 utilize the same hardware and/or software to execute the types of hashing algorithms described herein.

As described herein, various benefits and advantages of multifactor, multichannel authentication techniques may be provided. Moreover, the authentication techniques are provided in a manner that is highly convenient and efficient for all users thereof, while also providing the possibility of additional features and services not traditionally present in existing multifactor authentication systems.

Figure 2:
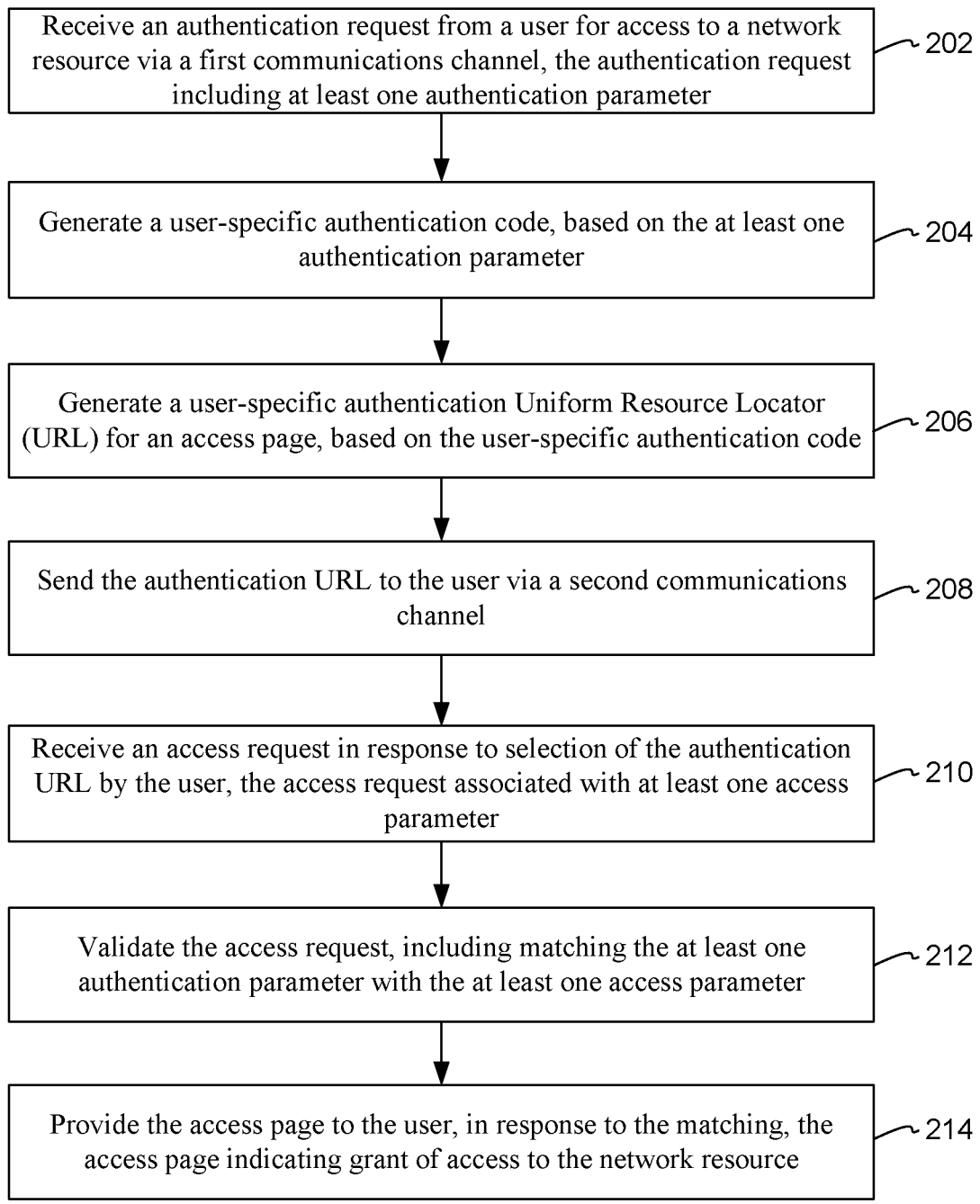
FIG. 2 is a flowchart illustrating example operations of the system of FIG. 1.

FIG. 2 is a flowchart 200 illustrating example operations of the system 100 of FIG. 1. In the example of FIG. 2, operations 202-214 are illustrated as separate, sequential operations. However, it will be appreciated that, in additional or alternative implementations, two or more operations may be executed in a partially or completely overlapping or parallel, or in a nested, iterative, looped, or branched fashion. In these various implementations, one or more of the operations 202-214 may be omitted, or replaced with another suitable or equivalent operation.

In FIG. 2, an authentication request may be received from a user for access to a network resource via a first communications channel, the authentication request including at least one authentication parameter (202). For example, the request handler 116 of FIG. 1 may receive, via the MFAUV API 114 as part of a first communications channel 125A, an authentication request from the user 104, for access to the network resource 112. As referenced above, in some implementations, the authentication request may be in conjunction with, e.g., subsequent to, a preceding one or more authentication request (e.g., associated with a username/password or fingerprint-based authentication). In other implementations, the authentication request may be an initial authentication request of the user. For example, as described below with respect to FIG. 5, the initial authentication request may simply be a text or other message from the user 104 requesting access to the network resource 112.

A user-specific authentication code may be generated, based on the at least one authentication parameter (204). For example, the authentication code generator 118 may be configured to execute a hashing algorithm, or use any other appropriate generation technique, to generate the authentication code as being specific to the user 104. For example, the authentication code generator 118 may utilize the time-based onetime password (TOTP) algorithm, which computes a onetime password using a shared secret key and a current time, as described in the request for comments (RFC) 6238 document, or some other version or extension of a onetime password (OTP).

As also referenced above with respect to FIG. 1, it will be appreciated that the authentication request received from the user may be associated with at least one authentication parameter specific to the user 104, and the authentication request may thereafter be supplemented or modified by the MFAUV client 110 to include authentication parameters specific to the MFAUV client 110. For example, as referenced above and described in detail below, the MFAUV client 110 may modify the authentication request to include an account identifier of the MFAUV client 110, a success message to be included in response to a successful authentication, or a quantity of time desired before the authentication request will time out or expire.

A user-specific authentication URL for an access page may be generated, based on the user-specific authentication code (206). For example, the URL generator 120 may generate a standard or base URL, referencing an existing static page, wherein the existing URL is parameterized using the authentication code generator by the authentication code generator 118, to thereby be specific to the user 104.

The authentication URL may then be sent to the user via a second communications channel (208). For example, the message generator 122 may generate and send the message 128 including the authentication URL 130 to the mobile device 124 of the user 104, via the communications channel 125B.

In response to a selection of the authentication URL by the user, an access request may be received, the access request being associated with at least one access parameter (210). For example, the validation engine 132 may receive the access request in association with a clicking on or other selection of the authentication URL 130 by the user 104. For example, the at least one access parameter may be included in otherwise standard information that is typically sent to a host or other server of a webpage, when a corresponding URL of that webpage is selected. In the example of FIGS. 1 and 2, however, such information includes, or references, the unique authentication code included therein, without any specific, or additional action or knowledge required of the user 104.

The access request may then be validated, including matching the at least one authentication parameter with the at least one access parameter (212). For example, the validation engine 132 may utilize information within the at least one access parameter in conjunction with the same or similar hashing algorithm used by the authentication code generator 118 to generate the authentication code. That is, by hashing the at least one access parameter, the validation engine 132 may then match the results of the hashing with the generated authentication code, and by matching the hashing results, may verify and validate that the access parameter and authentication parameter correspond to one another.

The access page may then be provided to the user, in response to the matching, the access page indicating grant of access to the network resource (214). For example, the rendering engine 134 may utilize the page templates 136, customization data 138, and any relevant information received from the MFAUV client 110 in conjunction with the original authentication request, to thereby generate the access page 142, including the success message 144. As referenced, and described below, e.g., at least with respect to FIGS. 4 and 5, various additional or alternative content may be included within the provided access page 142.

Figure 3:
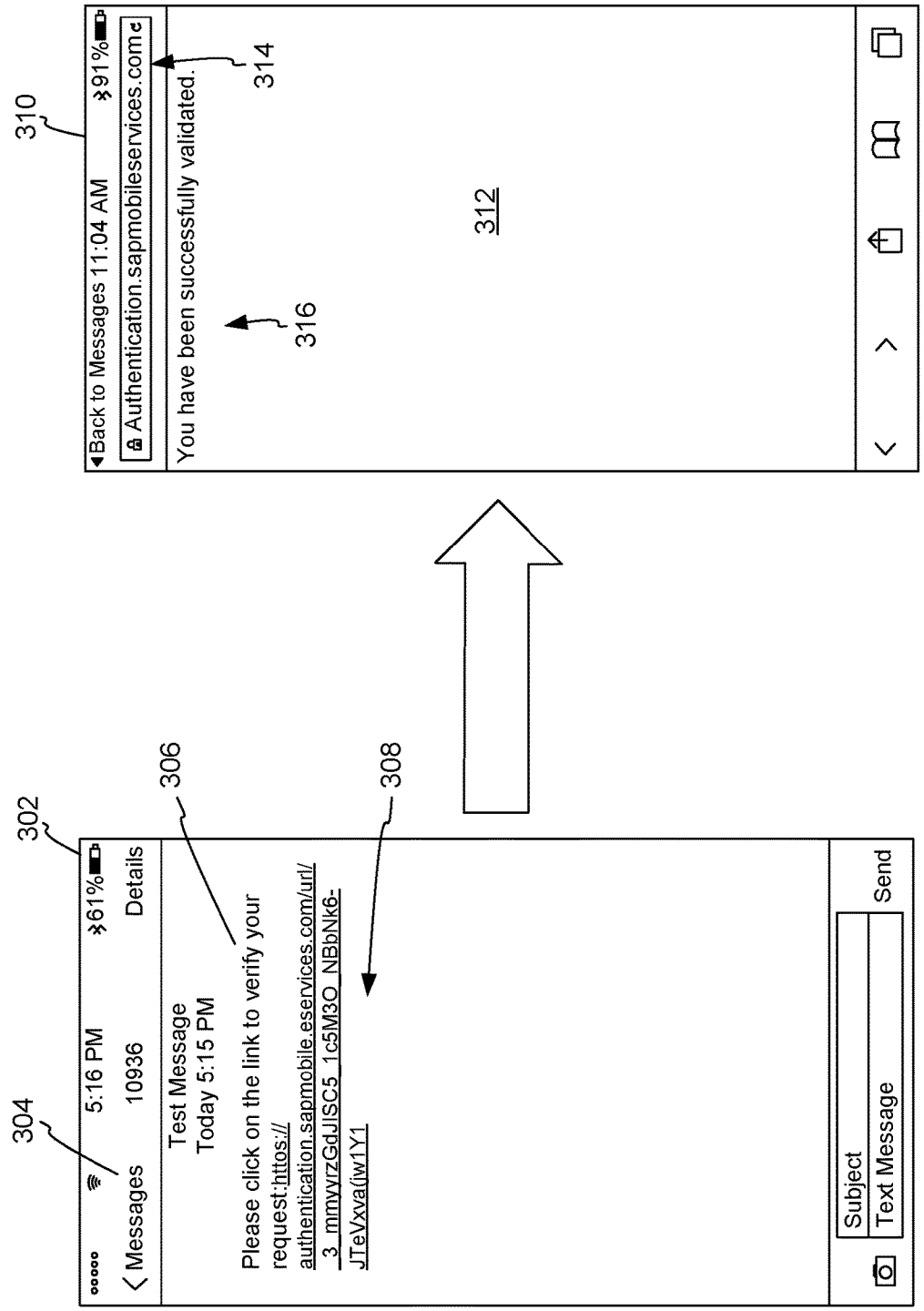
FIG. 3 illustrates screenshots of a device using the system of FIG. 1.

FIG. 3 illustrates screenshots of a device using the system of FIG. 1. In the example of FIG. 3, a screenshot 302 of a corresponding mobile device, representing, e.g., the mobile device 124 of FIG. 1, it is illustrated as providing a messaging application 304. As also illustrated in FIG. 3, a message 306, corresponding to the message 128 of FIG. 1, may be provided. As shown, the message 306 includes an authentication URL 308 that corresponds to the authentication URL 130 of FIG. 1. As described above, and as illustrated in FIG. 3, the authentication URL 308 identifies a particular page location, parameterized to include a unique authentication code, or derivation thereof.

Further in FIG. 3, a screenshot 310 illustrates a browser screen 312 in which an address bar 314 of the browser displays the URL of the message 306 (i.e., the authentication URL 308). In other words, it is apparent from FIG. 3 that the screenshot 310 illustrates the results of the user clicking on the authentication URL 308. In the example, the browser window 312 includes a success message 316, corresponding to the success message 144 of FIG. 1, which informs the user that he or she has been successfully validated. Thereafter, in practice, the user may return to an original application or context in which the original authentication request was submitted, and, in that context, proceed with access to the request in network resource.

Figure 4:
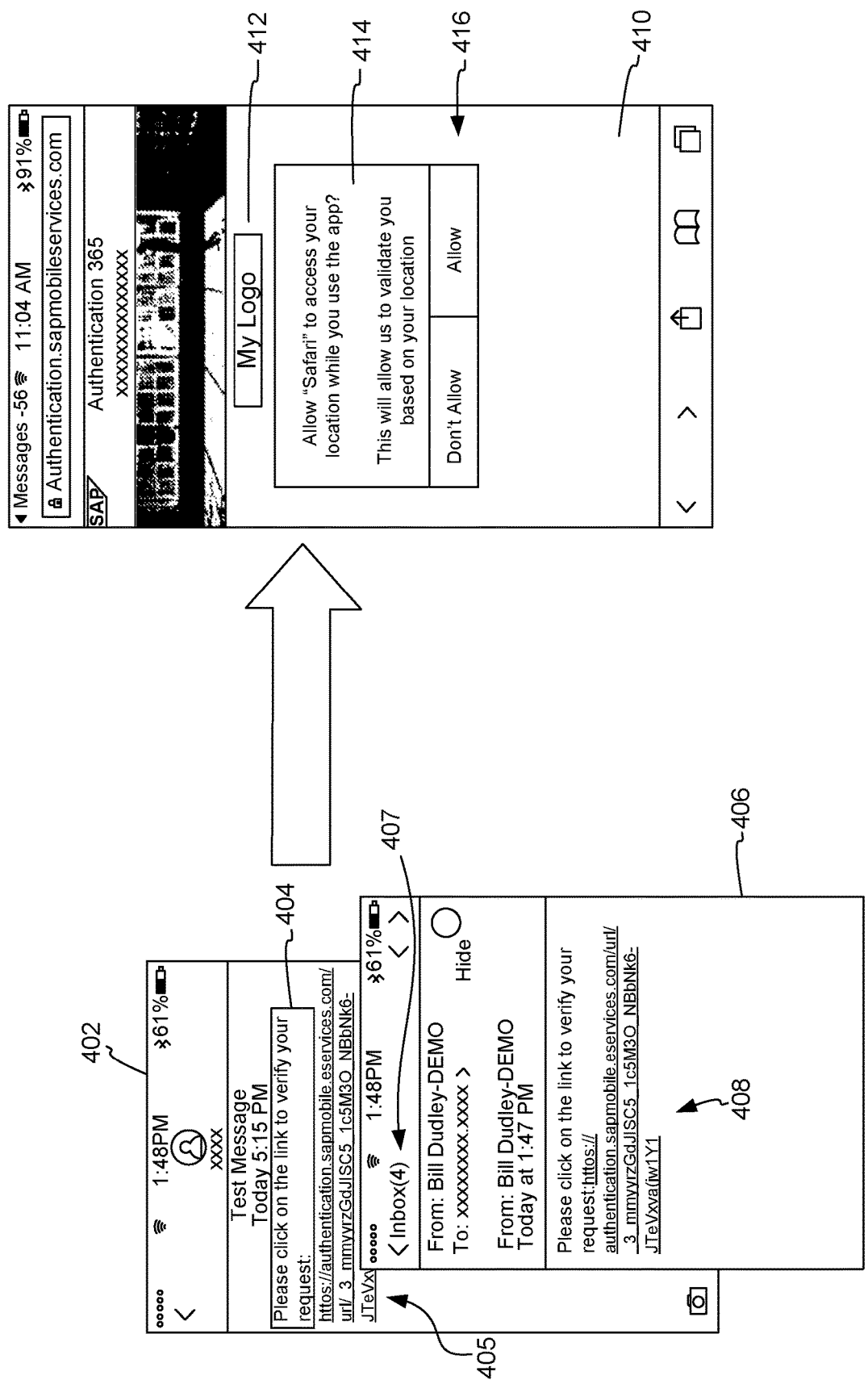
FIG. 4 illustrates alternative example implementations of one or more devices using the system of FIG. 1.

FIG. 4 illustrates alternative example implementations of one or more devices using the system of FIG. 1. In the example of FIG. 4, a screenshot 402 provides an illustrative example of a different type of messaging app location, in which a message 404 includes a corresponding authentication URL 405. In an alternative implementation, a screenshot 406 of an email application 407 illustrates that an authentication URL 408 may be sent in a secondary communications channel that includes email transmissions, rather than SMS message channels. Of course, as referenced, other alternative communications channels also may be used.

Regardless of how an authentication URL is provided, FIG. 4 illustrates example implementations in which selection or execution of the authentication URL 405/408 causes location information to be provided in response. That is, with respect to the terminology of FIGS. 1 and 2, the at least one access parameter provided in conjunction with selection of the authentication URL 405/408 includes a location parameter.

For example, the validation engine 132 may utilize one or more techniques to determine or deduce a location of the user, such as relying on an internet protocol (IP) address provided in conjunction with selection of the authentication URL 405/408. Then, in conjunction with providing an access page 410 with a customized logo 412 for the MFAUV client 110, a share location request 414 may be provided.

The user may be provided with options 416 for allowing or not allowing access to the user's location via a secondary approach, such as access to a GPS feature of the user's mobile device. Assuming the user allows such location access, the validation engine 132 may compare the two sources of location information, as an additional authentication technique. Depending on specific applications in context, the location information may be relatively precise, including latitude/longitude coordinates, or may correspond to a city or other geographical area, or may be relatively low precision, such as a state or country.

Such location information thus illustrates additional authentication techniques that may be useful in various contexts, and that may be utilized with minimal knowledge or effort required of the user. For example, in scenarios in which the user is executing a credit card or other financial transaction, the techniques of FIG. 4 may ensure that the user is at a location of a store from which the credit card transaction is also received.

Figure 5:
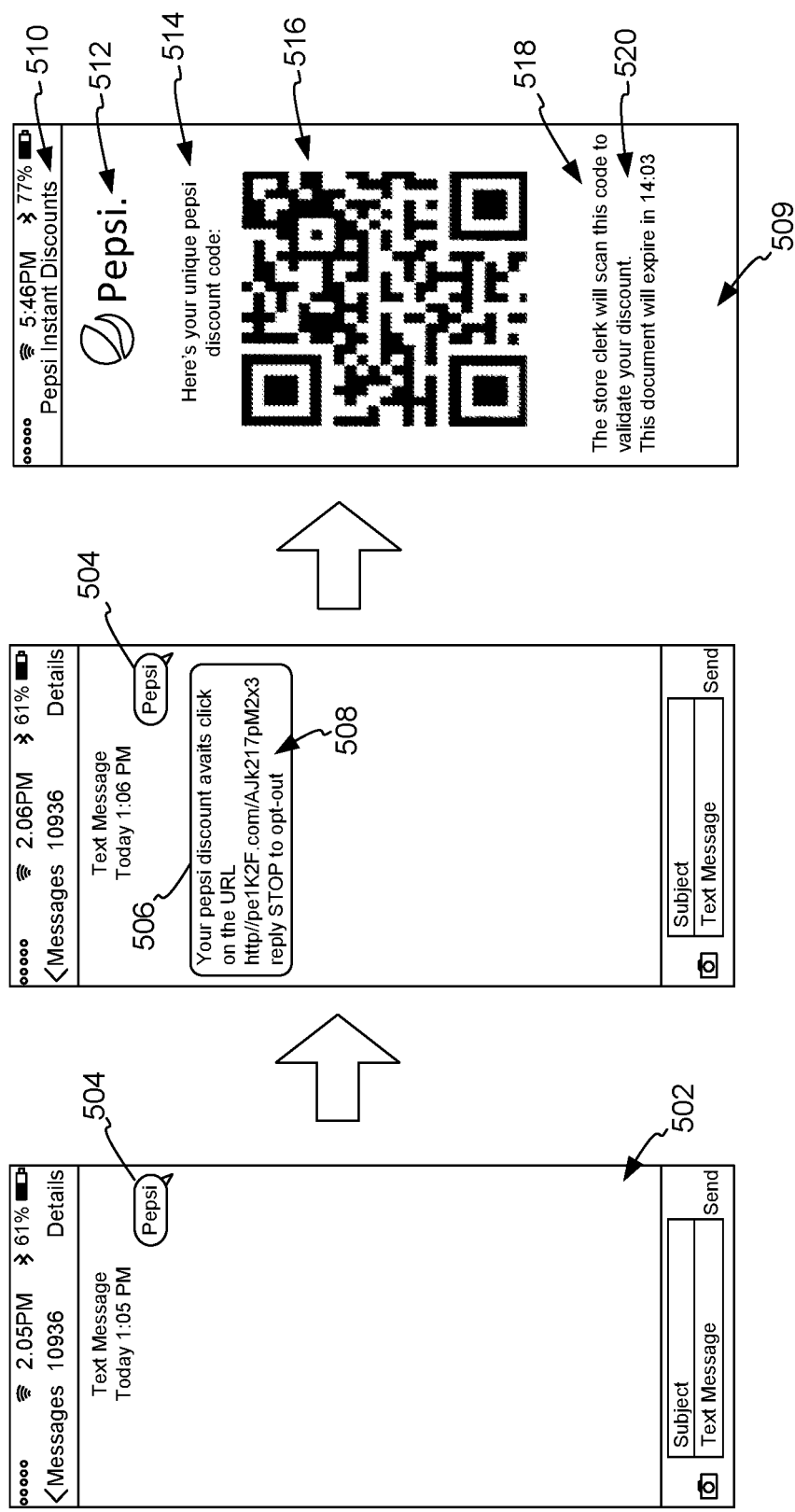
FIG. 5 illustrates screenshots of the device using the system of FIG. 1 in conjunction with providing coupon codes.

FIG. 5 illustrates screenshots of the device using the system of FIG. 1 in conjunction with providing coupon codes. In the example of FIG. 5, an example is provided to illustrate that the types of URL delivery described above with respect to FIGS. 1-4 may be utilized to provide various types of network resources in a user-specific (e.g., specific to a mobile phone of a user) manner, including generating the types of user-specific authentication URLs described herein.

For example, in FIG. 5, an example is provided in which user-specific coupons or coupon codes may be provided. In the example, the user may view a sign that says "text "Pepsi" to 10936 to receive a 50% discount in the next 15 minutes at our store on Pepsi products." Accordingly, in FIG. 5, a screenshot 502 illustrates such a text message 504.

Upon receipt of the text message 504 at the MFAUV client 110, the MFAUV manager 102 will receive the text message and associated authentication parameters via the MFAUV API 114. The request handler 116 will pass the contents and associated authentication parameters of the message 504 to the authentication code generator 118 as described herein, whereupon the URL generator 120 may utilize the resulting authentication code to be included within a message 506 sent by the message generator 122, and demonstrated as authentication URL 508 in the example of FIG. 5.

In response to selection of the authentication URL 508, the validation engine 132 will receive corresponding access parameters, which may then be matched to the authentication code generator by the authentication code generator 118. The validation engine 132 may then instruct the rendering engine 134 to provide a webpage 509 within a browser screen and thereby provide a coupon code or other pre-specified network resource.

For example in FIG. 5, the webpage 509 includes a screen title 510, a customized logo 512, and customized text 514 instructing and informing the user regarding the contents of the page 509. Specifically, as shown, a QR (quick response) code 516 (or barcode or other suitable code) may be included. The page 509 may additionally include further text 518 after the QR code 516, as well as an expiration countdown 520 informing the user regarding a remaining time until expiration of the offer associated with the coupon code of the QR code 516.

In this way, the user may quickly and easily obtain and present the QR code 516, and thereby obtain access to the advertised coupon opportunity. In practice, the various elements of the page 509 may be set as one or more screen profiles as part of associated account default provided by the MFAUV client 110 when registering the MFAUV API 114 with the MFAUV manager 102. In this way, a specific screen profile to use may be specified within a corresponding API call of the MFAUV API 114, as configured by an administrator of the MFAUV client 110 via an appropriate administrator interface.

Figure 6:
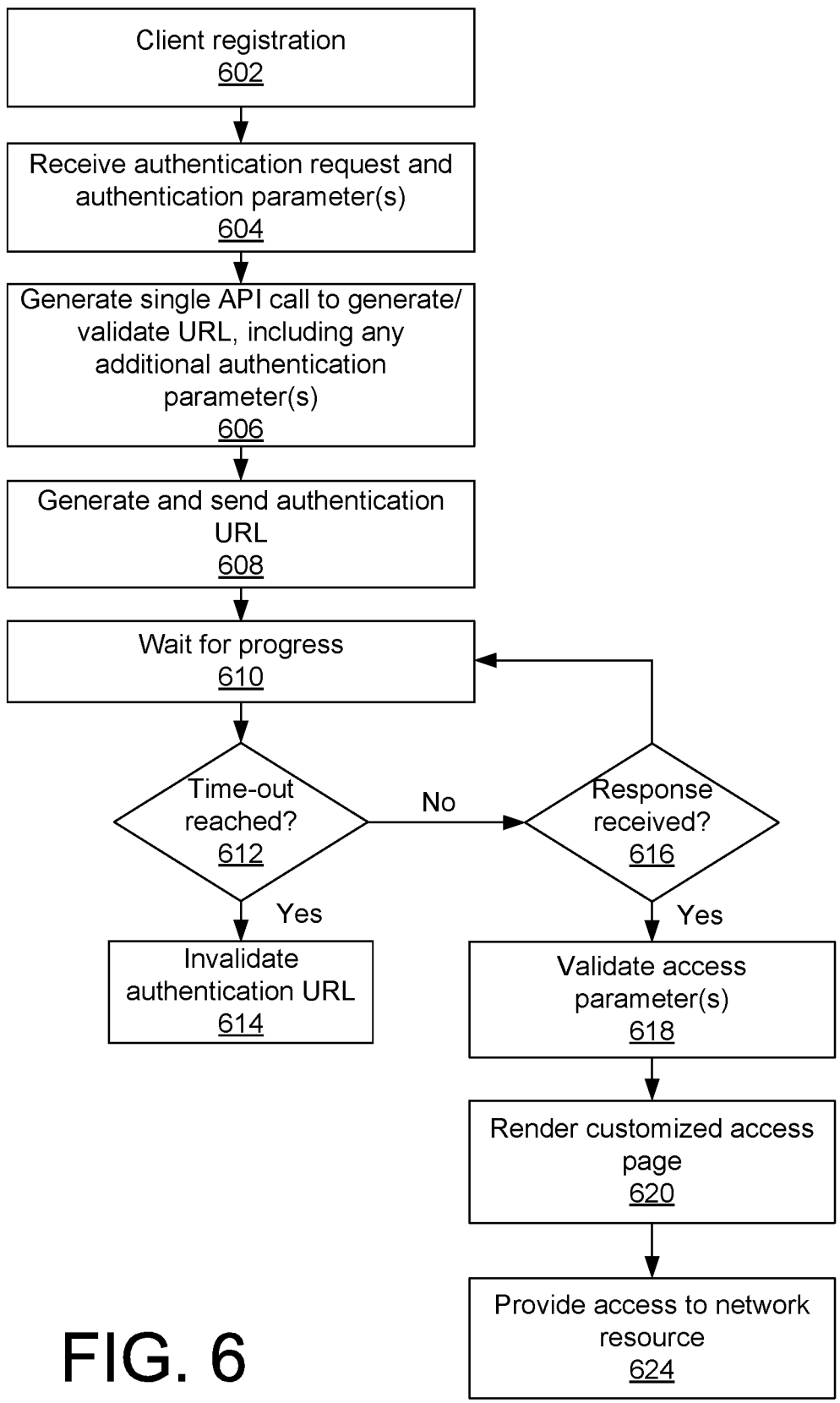
FIG. 6 is a flowchart illustrating more detailed example implementations of the system of FIG. 1.

FIG. 6 is a flowchart 600 illustrating more detailed example operations of the system 100 of FIG. 1. In the example of FIG. 6, the MFAUV client 110 may initially register with the MFAUV manager 102 (602). For example, as may be appreciated from the above description, the MFAUV client 110 may utilize an appropriate interface or dashboard provided by the MFAUV manager 102 to obtain the MFAUV API 114. Further, the MFAUV client 110 may provide preferences for the page templates 136 and customization data 138 to be utilized in conjunction with authentication requests to be granted by the MFAUV client 110 for providing access to the network resource 112. More generally, the MFAUV client 110 may express general preferences and parameters for the manners in which the MFAUV client 110 would like to conduct the various authentication processes of the system 100 of FIG. 1 as described herein.

Subsequently, the MFAUV client 110 receives an authentication request and associated authentication parameters (604), such as from the user 104 via the first communications channel 125A. As may be appreciated from the above descriptions of FIGS. 1-5, the initial authentication request may be a relatively extensive or complicated request, or set of requests, such as when the user 104 provides one or more of a username/password combination, a biometric identifier, or other known or future authentication techniques. In other scenarios, such as described above with respect to FIG. 5, the initial authentication request may be as simple as receiving a text from the user 104, such as the text 504 of FIG. 5.

Upon successful receipt and confirmation/validation of the authentication request, the MFAUV client 110 may utilize via the MFAUV API 114 to generate a single API call to both generate and validate the authentication URL 130, wherein the API call includes any additional authentication parameters that may be added by the MFAUV client 110 (606). In other words, it will be appreciated that requirements of the MFAUV client 110 are minimal, and that, for example, extensive interactions between the MFAUV client 110 and the MFAUV manager 102 are not required. Instead, as just described, the MFAUV client 110 may send a single API call that contains all necessary information for the MFAUV manager 102 to proceed with, and execute, the desired authentication.

For example, the API call to be generated may include, or be represented by, the simplified example of Pseudocode 1:

---
Pseudocode 1
---
Header
Content-Type: application/json
Authorization: <token type> <oAuth token>
Body
{
  "accountId": <MFA Account_ID>,
  "telephoneNumber": "<phone_number>",
  "emailAddress" : <email address>,
  "successmsg": "<Successful authorization message>",
  "characterSet": "\[ ]",
  "timeOut": 30}
Response
{
  "status": <Status>,
  "message": <Message>,
}

---

As demonstrated in Pseudocode 1, a header may be utilized to specify a content type and authorization token, where the authorization token may have been obtained during the preceding authorization processes of operation 604.

Pseudocode 1 also may include a body with various body parameters. For example, the body parameters may include an account ID, which represents an account ID provided by the MFAUV manager 102 that is specific to the MFAUV client 110. The body also includes a telephone number or email address of the user 104, thereby specifying the second communications channel 125B that will be used to receive the authentication URL 130. The body may further include a success message parameter that is a string containing the message that will be displayed in the user's browser in conjunction with successful validation, e.g., the success message 144 of FIG. 1.

Finally in the body portion of pseudo code 1, character set and time out parameters may be configured. In particular, it will be appreciated that the expiration or other time out parameter is highly configurable and variable in the examples of FIGS. 1-6. For example, in conventional multifactor authentication systems, time out or expiration timers are typically very restricted, in order to minimize a possibility of illicit access by unauthorized users. However, in various implementations of the system 100 of FIG. 1, it may be permissible or desirable to relax such requirements in certain context. For example, in the example of FIG. 5, as referenced above, a time out period for a coupon code may be substantially longer than a conventional two factor authentication timer, since the coupon provider may wish to configure a quantity of time available to the user for use of the coupon, and since a consequence of unauthorized access to the coupon in the scenario of FIG. 5 is minimal.

Pseudocode 1 also includes a response portion which describes and characterizes a response to be sent in conjunction with successful validation. In the simplified example of pseudo code 1, the response portion simply specifies a status (e.g., a success) of the authentication request, as well as any associated message to be included. It will be appreciated that variations of the response portion of pseudo code 1 may be configured in any desired manner including those inferred from the descriptions of FIGS. 1-5 above, as well as the remaining description of FIG. 6.

Once the authentication URL is generated and sent (608) via the secondary communications channel 125B, the validation engine 132 may proceed to wait for the expected response (610). If the specified time out period is reached (612), then the authentication URL may be invalidated. Otherwise, if the timeout period has not been reached (612), and a response has not been received (616), then the validation engine 132 may simply continue to wait for the expected response (610).

Otherwise, if the response is received (616), then the validation engine 132 may receive and validate the access parameters associated with the selection of the authentication URL 130 (618), as described herein. As described, the access parameters may include, e.g., location information, and other data that may be used to validate, authenticate, or otherwise service the user 104. Accordingly, the rendering engine 134 may proceed to render the customized access page (e.g., the access page 142), in conjunction with the page templates 136, the customization data 138, and any additional page parameterization information included within the API call from the MFAUV API 114 (620).

Finally in FIG. 6, the MFAUV client 110 may proceed to provide access to the network resource 112. For example, the MFAUV client 110 may grant the user 104 with access to a private user account of the user 104, or provide any other type of resource access described herein, or apparent to one of skill in the art.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
receive an authentication request from a first user for access to a network resource via a first communications channel, the authentication request including at least one authentication parameter, wherein the at least one authentication parameter comprises location information of the first user;
generate a user-specific authentication code, based on the at least one authentication parameter;
generate a user-specific authentication Uniform Resource Locator (URL) for an access page, based on the user-specific authentication code;
send the authentication URL to the first user via a second communications channel;
receive an access request in response to selection of the authentication URL by a second user, the access request associated with at least one access parameter, wherein the at least one access parameter comprises information separate from the authentication URL identifying the second user associated with the access request, and wherein the at least one access parameter comprises location information of the second user;
validate the access request, wherein validating the access request comprises verifying a match between the location information of the first user and the location information of the second user to confirm that the first user and the second user are the same, wherein the first user and the second user are the same when the location information of the first user corresponds to the location information of the second user; and
provide the access page to the first user, in response to the matching, the access page indicating grant of access to the network resource.

2. The computer program product of claim 1, wherein the authentication request and the validated access request provide a first authentication factor, and the authentication request is received in conjunction with at least a second authentication request that relies on a second authentication factor, to thereby provide multi-factor authentication of the first user with respect to the network resource.

3. The computer program product of claim 1, wherein the at least one authentication parameter includes an expiration time defined with respect to a time of the authentication request.

4. The computer program product of claim 1, wherein the at least one authentication parameter includes a telephone number of a mobile device of the first user to which the authentication URL is sent.

5. The computer program product of claim 1, wherein the instructions, when executed, are further configured to generate the user-specific authentication code using a one-time password hashing algorithm.

6. The computer program product of claim 1, wherein the instructions, when executed, are further configured to:
receive the authentication request by way of a client application program interface (API) of a client providing the network resource,
wherein the authentication request is supplemented at the client to include at least one client-specific authentication parameter that is then used when generating the user-specific authentication URL.

7. The computer program product of claim 6, wherein the at least one authentication parameter and the at least one access parameter each comprises location data.

8. The computer program product of claim 6, wherein the authentication URL is generated using data types that are not the same data type as the at least one access parameter, and wherein the instructions, when executed, are further configured to:
notify the client of the validation of the access request.

9. The computer program product of claim 1, wherein the instructions, when executed, are further configured to:
generate a message in response to the validation of the access request;
include the authentication URL within the message;
send the message to the first user via the second communications channel; and
receive the access request in response to the selection of the authentication URL from within the message.

10. The computer program product of claim 1, wherein the instructions, when executed, are further configured to:
provide the access page including a quick review (QR) code; and
provide, the network resource in response to receipt of a scanning of the QR code.

11. A computer-implemented method, comprising:
receiving an authentication request from a first user for access to a network resource via a first communications channel, the authentication request including at least one authentication parameter, wherein the at least one authentication parameter comprises location information of the first user;
generating a user-specific authentication code, based on the at least one authentication parameter;
generating a user-specific authentication Uniform Resource Locator (URL) for an access page, based on the user-specific authentication code;
sending the authentication URL to the first user via a second communications channel;
receiving an access request in response to selection of the authentication URL by a second user, the access request associated with at least one access parameter, wherein the at least one access parameter comprises information separate from the authentication URL identifying the second user associated with the access request, and wherein the at least one access parameter comprises location information of the second user;
validating the access request, wherein validating the access request comprises verifying a match between the location information of the first user and the location information of the second user to confirm that the first user and the second user are the same, wherein the first user and the second user are the same when the location information of the first user corresponds to the location information of the second user; and
providing the access page to the first user, in response to the matching, the access page indicating grant of access to the network resource.

12. The method of claim 11, wherein the authentication request and the validated access request provide a first authentication factor, and the authentication request is received in conjunction with at least a second authentication request that relies on a second authentication factor, to thereby provide multi-factor authentication of the first user with respect to the network resource.

13. The method of claim 11, wherein the at least one authentication parameter includes a time period defined with respect to a time of the authentication request.

14. The method of claim 11, wherein the at least one authentication parameter includes a telephone number of a mobile device of the first user to which the authentication URL is sent.

15. The method of claim 11, further comprising:
receiving the authentication request by way of a client application program interface (API) of a client providing the network resource,
wherein the authentication request is supplemented at the client to include at least one client-specific authentication parameter that is then used when generating the user-specific authentication URL.

16. The method of claim 11, further comprising:
generating a message in response to the validation of the access request;
including the authentication URL within the message;
sending the message to the first user via the second communications channel; and
receiving the access request in response to the selection of the authentication URL from within the message.

17. A computer program product, the computer program product being tangibly embodied on a non-transitory computer-readable storage medium and comprising instructions that, when executed, are configured to cause at least one computing device to:
receive an authentication request from a first user for a network resource;
execute a first authentication factor with respect to the first user;
execute a second authentication factor with respect to the first user, including:
receiving at least one authentication parameter that is unique to the first user, via a client operable to provide the network resource, wherein the at least one authentication parameter comprises location information of the first user;
selecting a uniform resource locator (URL) for a web page associated with the client;
parameterizing the URL using the at least one authentication parameter, to obtain an authentication URL that is unique to the first user
sending a message to the first user that contains the authentication URL
receiving at least one access parameter in conjunction with a selection of the authentication URL by a second user, wherein the at least one access parameter comprises information separate from the authentication URL identifying the second user, and wherein the at least one access parameter comprises location information of the second user; and
verifying a match between the location information of the first user and the location information of the second user to confirm that the first user and the second user are the same, wherein the first user and the second user are the same when the location information of the first user corresponds to the location information of the second user; and validate the authentication request, based on the matching, to provide the first user with access to the network resource.

18. The computer program product of claim 17, wherein the parameterizing includes:

generating an authentication token using a one-time password algorithm; and generating the authentication URL based on the authentication token and the web page associated with the client.

19. The computer program product of claim 17, further comprising:

sending a success page associated with the client informing the first user of the validation of the authentication request and access to the network resource.

* * * * *